(12) United States Patent
Arhab et al.

(10) Patent No.: US 8,479,902 B2
(45) Date of Patent: Jul. 9, 2013

(54) HYDROKINETIC COUPLING DEVICE COMPRISING LOCK-UP CLUTCH EQUIPPED WITH ELASTIC MEANS OF CIRCUMFERENTIAL PRELOAD

(75) Inventors: Rabah Arhab, Saint Brice Sous Forêt (FR); Norberto Termenon, Paris (FR)

(73) Assignee: Valeo Embrayages, Amiens (FR)

( * ) Notice: Subject to any disclaimer, the term of this patent is extended or adjusted under 35 U.S.C. 154(b) by 186 days.

(21) Appl. No.: 12/738,304

(22) PCT Filed: Oct. 17, 2008

(86) PCT No.: PCT/FR2008/051878
§ 371 (c)(1),
(2), (4) Date: Jul. 1, 2010

(87) PCT Pub. No.: WO2009/053656
PCT Pub. Date: Apr. 30, 2009

(65) Prior Publication Data
US 2010/0276243 A1    Nov. 4, 2010

(30) Foreign Application Priority Data

Oct. 17, 2007    (FR) ...................................... 07 58388

(51) Int. Cl.
*F16H 45/02*    (2006.01)
(52) U.S. Cl.
USPC ........................................................ 192/3.3

(58) Field of Classification Search
USPC ................................ 192/3.3, 30 V, 70.18, 70.2
See application file for complete search history.

(56) References Cited

U.S. PATENT DOCUMENTS

| 5,653,321 | A | 8/1997 | Takaoka et al. |
| 7,614,483 | B2 * | 11/2009 | Klingner et al. |
| 7,654,373 | B2 * | 2/2010 | Degler ............................ 192/3.3 |
| 7,975,817 | B2 * | 7/2011 | Mueller et al. .................. 192/3.3 |
| 2001/0013454 | A1 * | 8/2001 | Yamamoto |

FOREIGN PATENT DOCUMENTS

| EP | 1 371 867 | 12/2003 |
| FR | 2 765 939 | 1/1999 |

* cited by examiner

*Primary Examiner* — Gregory Binda
*Assistant Examiner* — Josh Skroupa
(74) *Attorney, Agent, or Firm* — Berenato & White, LLC

(57) ABSTRACT

A hydrokinetic coupling device includes a lock-up clutch having at least one friction disc mounted such that it can slide axially with respect to a first rotary shaft, at least one first backing disc rotating as one with a secondary rotary shaft and a support ring to support the backing disc. The support ring has at least one axial groove circumferentially delineated by an upstream face and by a downstream face. A radial guide tooth of each backing disc is housed such that it can glide axially in the groove. Elastic preload elements are provided which are able to exert a preload torque to clamp the guide tooth of each braking disc circumferentially against one of either the upstream or downstream faces of the guide groove.

17 Claims, 7 Drawing Sheets

HYDROKINETIC COUPLING DEVICE COMPRISING LOCK-UP CLUTCH EQUIPPED WITH ELASTIC MEANS OF CIRCUMFERENTIAL PRELOAD

FIELD OF THE INVENTION

The invention relates to a hydrokinetic coupling device, in particular for a motor vehicle, comprising a lock-up clutch.

The invention more particularly relates to a hydrokinetic coupling device, in particular for a motor vehicle, with longitudinal axis of rotation, comprising a lock-up clutch which comprises:

- at least one coaxial friction disc which rotates as one with a first rotary shaft and which is mounted such that it can slide axially with respect to the first rotary shaft;
- at least one first backing disc which rotates as one with a second rotary shaft and which is mounted such that it can slide axially with respect to the second rotary shaft;
- at least one axial abutment element which rotates as one with each backing disc, the friction disc being interposed axially between the first backing disc and the abutment element, the abutment element thus enabling a reaction to be created for clamping the friction disc;
- a coaxial support ring of each backing disc which rotates as one with the second rotary shaft and which comprises at least one axial guide groove circumferentially delineated by an upstream face and by a downstream face, an associated radial guide tooth of each backing disc being housed such that it can slide axially with circumferential play in the groove;
- a rear piston which can move between a disengaged rear position in which the backing discs are axially separated, and an engaged front position in which each backing disc is pushed forward axially against the axial abutment element clamping the intercalated friction disc so as to rotationally couple the first rotary shaft with the second rotary shaft.

BACKGROUND OF THE INVENTION

In clutches of this type, the backing discs are generally rotationally linked to the driving shaft. However, under certain conditions of use, the driving shaft turns in a non-cyclical way, that is to say it produces abrupt changes in the rotational speed of the driving shaft. These jolts cause a slight rotation of the backing discs with respect to their support ring due to the circumferential play between the guide teeth and the guide groove, in particular when the lock-up clutch is in its disengaged position.

The guide teeth then violently strike, alternately, the upstream face and the downstream face of the guide groove. These shocks are the source of unpleasant operating noises for the user.

SUMMARY OF THE INVENTION

To solve this problem the invention proposes a device of the type described above, characterized in that it comprises elastic preload means which are able to exert a preload torque to clamp the guide tooth of each backing disc circumferentially against one of either the upstream or downstream faces of the guide groove.

According to other characteristics of the invention:

- the elastic preload means comprise an elastically circumferentially deformable element which is interposed axially between the guide tooth of the first backing disc and an anchoring element rotating as one with the first backing disc and which is mounted circumferentially loaded so as to exert a circumferential force for clamping the tooth so as to produce the preload torque;
- the deformable element is housed in the associated guide groove;
- the anchoring element is formed by the abutment element;
- the anchoring element is formed by the support ring;
- the device comprises at least one second backing disc coaxial with the first backing disc and consecutive to the first backing disc, the friction disc being interposed axially between the two consecutive backing discs, the backing discs rotating as one with the second rotary shaft and being mounted such that they can slide axially with respect to the second rotary shaft; the second backing disc comprising an associated radial guide tooth which is housed such that it can slide axially with circumferential play in said groove of the guide ring; and the anchoring element of the elastic preload means being formed by the tooth of the second backing disc so as to exert a preload torque to separate the guide teeth of the consecutive backing discs circumferentially against each of the upstream and downstream faces of the guide groove;
- the guide tooth of the first backing disc is offset circumferentially by a fixed angular pitch with respect to the associated guide tooth of the second backing disc;
- each backing disc comprises a plurality of radial guide teeth which are distributed regularly around the backing disc and each of which is housed in an associated axial guide groove of the support ring, the elastic preload means comprising a plurality of deformable elements which are associated with the guide teeth and which are arranged regularly around the backing discs;
- the elastic preload means comprise three deformable elements which are distributed at 120° from one another around the axis of rotation;
- the two consecutive backing discs are rotationally linked by the deformable elements;
- the deformable element is able to exert a second axial return force of the two consecutive backing discs into an axially separated position;
- the elastically deformable element is formed by at least one elastically flexible strip which is oriented circumferentially, an upstream end of the strip being fixed on the guide tooth of the first backing disc and a downstream end of the strip being fixed on the anchoring element;
- in its non-loaded state, the strip is cambered axially so that its upstream end is offset axially with respect to the downstream end, the strip being in a loaded state whenever the piston is in its disengaged rear position so as to produce the preload force;
- each end of the strip is fixed to the tooth or the associated anchoring element by means of rivets;
- the rivets are made from the same material as the teeth;
- the elastically deformable element is formed by at least one coil spring which is arranged circumferentially compressed between the two guide teeth of the same groove;
- the elastically deformable element is formed by a rod made of an elastomeric material which is arranged circumferentially compressed between the two guide teeth of the same groove;
- the lock-up clutch comprises at least three backing discs between which two friction discs are interposed successively, the first elastic preload means being arranged between the first and the second backing discs and the second elastic preload means being arranged between the second and the third backing discs;

the guide tooth of each backing disc extends radially towards the outside, the associated guide groove being arranged in the internal axial face of the annular ring which surrounds each backing disc externally.

BRIEF DESCIRPTION OF THE DRAWING

Other characteristics and advantages will appear on reading the detailed description below, for comprehension of which reference should be made to the appended figures, wherein.

DETAILED DESCRIPTION

In the description below, elements having identical, similar or analogous functions will be indicated by the same reference numbers.

In order to facilitate comprehension of the description and the claims, on a purely non-restrictive basis, use will be made of an axial orientation directed from rear to front which is indicated by arrow "A" of the figures and a radial orientation directed from inside to outside starting from the axis of rotation "B" of the hydrokinetic coupling device. In addition the terms upstream and downstream will be used to indicate elements arranged circumferentially in front of or behind a point of reference, turning around the axis of rotation in a clockwise direction.

Figure 1:
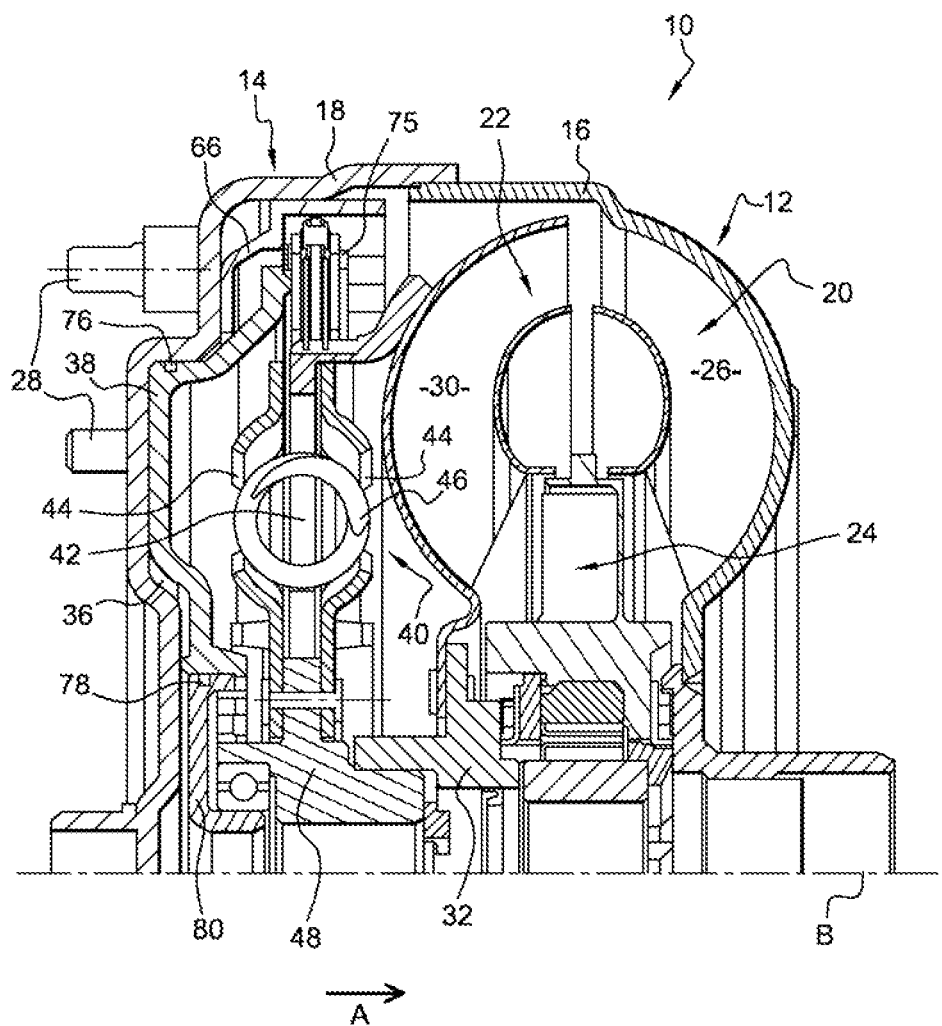
FIG. 1 is a semi-view in axial section of a hydrokinetic coupling device formed according to the teaching of the invention.

As this is known in the prior art, a hydrokinetic coupling device 10, as illustrated on FIG. 1, mainly comprises a torque converter 12 and a lock-up clutch 14 which are housed in the same sealed casing.

In the example illustrated on FIG. 1, more particularly the torque converter 12 is arranged axially in front of the lock-up clutch 14.

More particularly the casing is formed in two parts in the shape of a respectively front 16 and rear 18 shell.

Shells 16 and 18 are sealed against a fluid inside the casing and are assembled by welding for example. The casing is filled with oil for example.

The torque converter 12 comprises a front impulse starter wheel 20, a rear turbine wheel 22 and a central reaction wheel 24. The impulse starter wheel 20 comprises blades 26 which are held by the first front shell 16 fixed to the second rear driving shell 18.

The front 16 and rear 18 shells are rotationally linked with a first driving rotary shaft (not illustrated) which is coaxial with the axis "B" via fixing pins 28 held by the rear shell 18. Pins 28 thus form an input for the engine torque.

The turbine wheel 22 also comprises blades 30 which face blades 26 of the impulse starter wheel 20. The turbine wheel 22 is rotationally linked with a turbine hub 32 which is freely mounted so as to rotate around the axis "B" in order to support the turbine wheel 22 and to guide it rotationally.

The turbine wheel 22 is rotationally linked with a second rotary driven shaft (not illustrated), coaxial with the axis "B" of device 10 via a damping device 40.

In the case of application on a motor vehicle, the driving shaft consists of the crankshaft of an internal combustion engine (not illustrated) of the vehicle, while the driven shaft consists of the input shaft of a transmission (not illustrated) of the vehicle, connected to means for changing the speed ratio.

The lock-up clutch 14 for coupling the driving and driven shafts is activated after the vehicle has been started and after the driving and driven shafts have been coupled hydraulically by the torque converter 12, in order to avoid the loss of efficiency in particular induced by slip phenomena between the turbine 22 and impulse starter 20 wheels.

Device 10 is of the "three way" type for example, that is to say it includes a first fluid feed channel (not illustrated) of the hydraulic system of the torque converter 12 and a second outlet channel (not illustrated). A third feed channel, (not illustrated), independent from the first and second channels of converter 12, of a rear chamber 36 is intended to control the axial displacement of a rear piston 38 as will be described in more detail below.

In a first phase of operation, known as converter phase, the torque of the driving shaft is transmitted to the impulse starter wheel 20 which turns the turbine wheel 22 by oil circulation between blades 26 and 30 in an anti-clockwise direction referring to FIG. 1.

The turbine wheel 22 here rotates as one with the driven shaft via an input element of the damping device or shock absorber 40.

The input element here consists of a wheel centre 42 rotating as one with the turbine wheel 22 and its hub 32 with angular displacement. The torque is then transmitted by wheel centre 42 to the guide discs 44, forming the output element of shock absorber 40, via elastic bodies with circumferential action 46.

The output element of shock absorber 40 consists of the guide discs 44 of shock absorber 40 which are rotationally linked by riveting of a part forming hub 48.

During this converter phase, the shock absorber 40 does not participate in damping the torsional vibrations or oscillations produced in particular by engine acyclisms which are not or hardly transmitted since the engine torque is only transmitted via the kinetic energy of the oil in converter 12.

The sealed rear chamber 36, which is axially delineated to the rear by shell 18 of the casing and to the front by piston 38, is fed in a second lock-up phase. The piston 38, which can move axially, is able to clamp the lock-up clutch 14 axially forwards under action of the fluid pressure in chamber 36.

Piston 38 is also rotationally locked with respect to the casing by means which are not illustrated.

FIGS. 2 to 5 illustrate in more detail a first mode of embodiment of the lock-up clutch 14. This concerns a lock-up clutch 14 of the multi-disc type. The lock-up clutch 14 comprises at least one radial friction disc 50A, 50B which is mounted coaxially with the axis of rotation "B". In the example illustrated on FIGS. 1 to 5, the lock-up clutch 14 comprises two rear 50A and front 50B friction discs which are identical. Therefore only one friction disc 50A will be described below.

Figure 3:
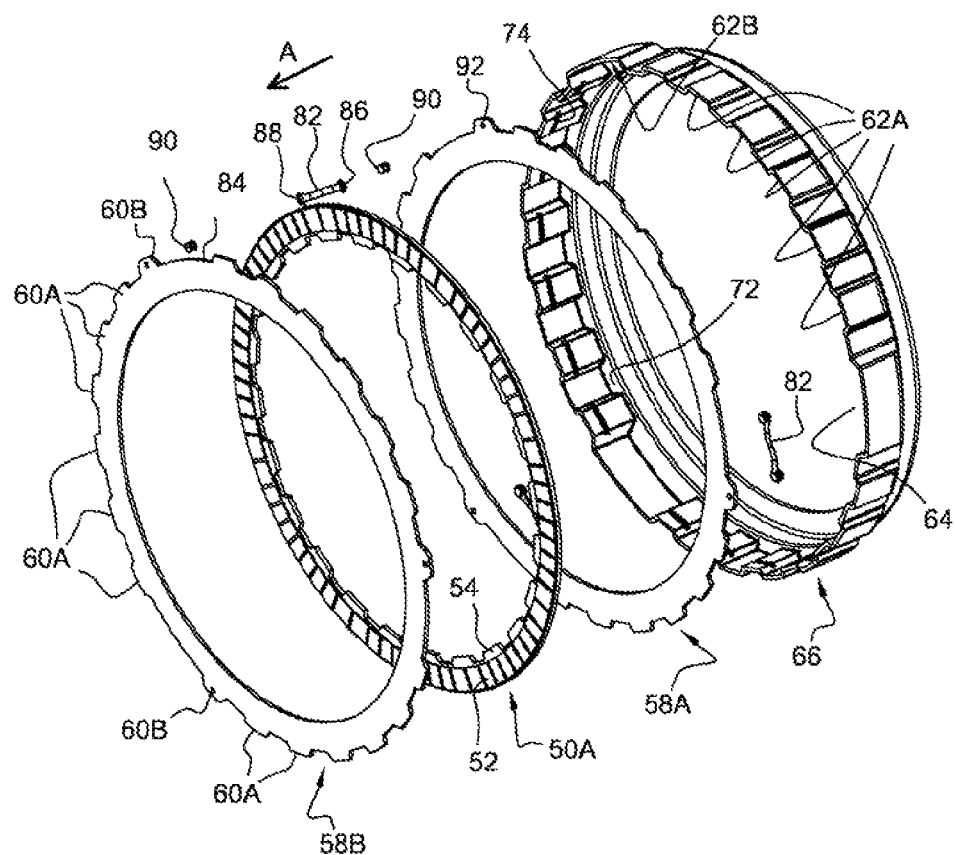
FIG. 3 is an exploded view which illustrates a lock-up clutch device of the device of FIG. 1.

As illustrated in more detail on FIG. 3, the friction disc 50A has an annular shape. Each of its radial front and rear faces is covered with an annular friction lining 52 which, depending on the design, can be annular segmented or annular grooved.

The friction disc 50A rotates as one with the driven shaft and is mounted such that it can slide axially with respect to the first driven shaft.

For this purpose, the friction disc 50A comprises radial teeth 54 which extend radially towards the inside from its inner peripheral edge. Teeth 54 are housed such that they can slide axially in axial grooves 56 of a first connecting part 42 which rotates as one with the input of shock absorber 40, for example wheel centre 42.

The lock-up clutch 14 also comprises at least two backing discs 58A, 58B, 58C coaxial with the axis of rotation "B" which are stacked axially. In the example illustrated on FIGS. 1 to 5, the lock-up clutch 14 comprises a first rear end backing disc 58A, a second central backing disc 58B and a third front end backing disc 58C.

The backing discs 58A, 58B, 58C are arranged so that each friction disc 50A, 50B is interposed axially between two consecutive backing discs 58A, 58B, 58C.

The backing discs 58A, 58B, 58C have a similar structure. Therefore only one backing disc 58A will be described below As illustrated on FIG. 2, the backing disc 58A has an annular shape with the same dimensions as the friction disc 50A. Thus, the guide teeth 54 of the friction disc 50A extend radially towards the inside beyond the internal peripheral edge of the backing disc 58A.

The backing disc 58A rotates as one with the driving shaft and is mounted such that it can slide axially with respect to the driving shaft.

For this purpose, the backing disc 58A comprises radial guide teeth 60A, 60B which extend radially towards the outside from its external peripheral edge. The guide teeth 60A, 60B here are identical in shape and dimension. The guide teeth 60A, 60B thus extend radially beyond the external peripheral edge of the friction disc 50A.

The guide teeth 60A, 60B here are distributed regularly around the backing disc 58A with a fixed angular pitch, known as single interdental angular pitch.

The guide teeth 60A, 60B are housed such that they can slide axially in associated axial guide grooves 62A, 62B which are formed in the internal annular axial face 64 of a support ring 66 which rotates as one with the rear shell 18 of the casing.

The associated guide teeth 60A, 60B of the backing disc 58A are housed such that they can slide axially with circumferential play in the associated grooves 62A, 62B to facilitate assembly of the lock-up clutch 14 and also to simplify its manufacture.

Figure 4:
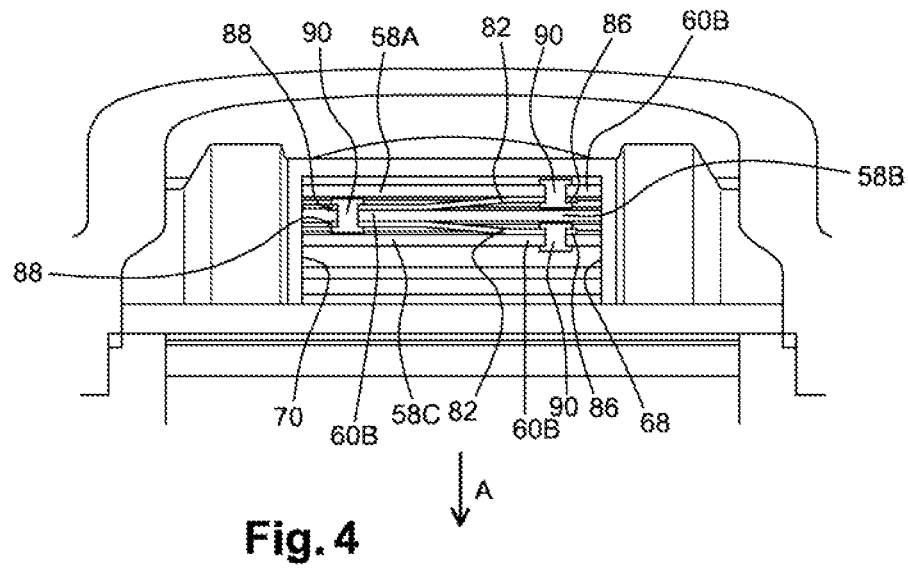
FIG. 4 is a sectional view along line 4-4 of FIG. 2.
Figure 5:
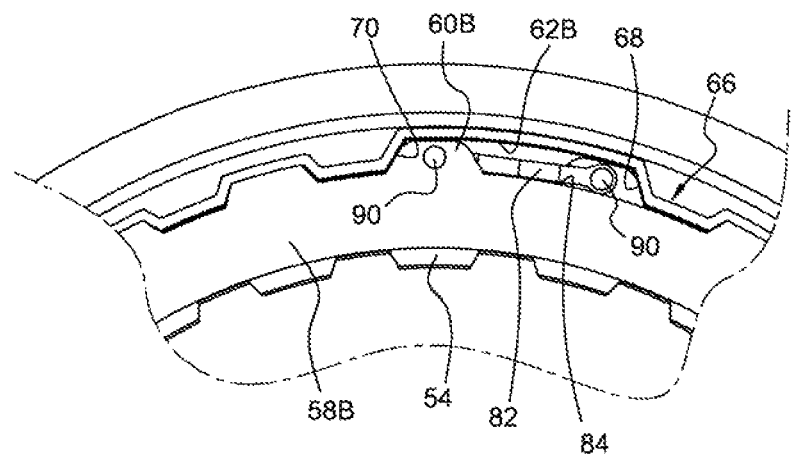
FIG. 5 is an axial view which illustrates the elastic preload means of the backing discs of the lock-up clutch of FIG. 3 in the mounted position.

Each axial guide groove 62A, 62B is circumferentially delineated by an upstream face 68 and a downstream face 70, as illustrated on FIGS. 4 and 5.

In addition, the guide grooves 62A, 62B are open to the front, while they are closed to the rear by the axial abutment front face of a flange 72 which extends radially towards the inside from a rear end edge of ring 66.

Ring 66 also comprises an annular throat 74 in its internal face 64 which is intended to house an axial abutment element formed by an abutment ring 75 for limiting displacements of the front end backing disc 58C towards the front. The abutment ring 75 enables a reaction to be created for clamping the friction discs, as will be described below.

Ring 66 is fixed to the rear face of the rear shell 18 radially surrounding piston 38 via its rear flange 72.

Ring 66 is produced by stamping a metal plate for example.

The rear piston 38 more particularly is arranged axially at the rear and opposite the rear face of the rear end backing disc 58A.

Piston 38 at its external radial periphery comprises an annular throat in which first means of sealing are mounted, such as a segment 76, which cooperate with an axial surface opposite the rear shell 18 and on its internal radial periphery a surface able to cooperate with second means of sealing, such as a segment 78, which is mounted in an annular throat of a hub 80 which the piston 38, with which it is rotationally linked by engagement, surrounds.

The dynamic means 76, 78 thus delineate the chamber 36 which is fed with fluid through a hollow shaft.

In the second lock-up phase, piston 38 enables the turbine wheel 22 and the driven shaft to be dis-engageably linked with the driving shaft. For this purpose, the rear piston 38 can move axially between a disengaged rear position in which the backing discs 58A, 58B, 58C are axially separated and an engaged front position in which the backing discs 58A, 58B, 58C are pushed forward axially against the axial abutment ring 75 of ring 66 by clamping the intercalated friction discs 50A, 50B so as to rotationally couple the first driven rotary shaft with the driving shaft.

In the engaged position, the torque of the driving shaft is transmitted via the lock-up clutch 14 to shock absorber 40, more precisely to wheel centre 42 and to elastic bodies 46 which dampen the torsional oscillations, then after angular displacement of the connection with play to guide discs 44 which are fixed on the hub 48 rotationally linked with the driven shaft. Hub 48 thus forms an output element of the engine torque.

According to an alternative of the invention—not illustrated—the turbine hub 32 is directly rotationally linked with the shaft driven for example via grooves. The turbine hub 32 then forms the output element of the engine torque.

For more detail as to the design and operation of such a hydrokinetic coupling device 10, reference should be made to one or other of documents FR-A-2 765 939 and U.S. Pat. No. 5,975,561.

During the operation of the engine, the driving shaft turns non-cyclically, which produces violent jolts. Whenever the lock-up clutch is in the disengaged position, the guide teeth 60A, 60B of the backing discs 58A, 58B, 58C then come to knock against the upstream or downstream faces of the associated guide grooves 62A, 62B due to inertia of the backing discs 58A, 58B, 58C.

To solve this problem, the invention proposes to provide the lock-up clutch 14 with elastic preload means which are able to exert a preload torque to clamp the guide tooth 60B of each backing disc 58A, 58B, 58C circumferentially against one of either the upstream 68 or downstream 70 faces of the guide groove 62B.

More particularly, in this first mode of embodiment, the elastic preload means are able to exert a preload torque to separate at least certain guide teeth 60B of two consecutive backing discs 58A, 58B, 58C circumferentially against each upstream face 68 and downstream face 70 of the guide groove 62A, 62B so that each backing disc 58A, 58B, 58C is constantly kept rotationally motionless with respect to the support ring 66.

FIG. 3 illustrates in detail the central backing disc 58B and the rear end backing disc 58A between which the rear friction disc 50A is interposed. The elastic preload means comprise an elastically deformable circumferentially compression element 82 which is interposed axially between a guide tooth 60B of the central backing disc 58B and a guide tooth 60B of the front end backing disc 58C, said teeth 60B being arranged in the same guide groove 62B.

Thus, the deformable element 82 rests against two anchoring elements formed respectively by the guide tooth 60B of the central backing disc 58B and by the guide tooth 60B of the front end backing disc 58C.

Said guide teeth will be designated preload teeth 60B below.

The deformable element 82 is housed in the guide groove 62B associated with the preload teeth 60B. The groove associated with the preload teeth 60B will therefore be called housing groove 62B.

The deformable element 82 is able to exert a circumferential separation force between the two preload teeth 60B so as to produce the preload torque. Thus, the preload tooth 60B of the central backing disc 58B is pressed flat against the downstream wall 70 of the housing groove 62B, while the preload tooth 60B of the rear end backing disc 58A is pressed flat against the upstream wall of the housing groove 62B. The preload teeth 60B of the central backing disc 58B will thus be called downstream preload tooth 60B, while the preload teeth 60B of the rear end backing disc 58A will be called upstream preload tooth 60B.

More particularly, the elastic preload means here comprise three elastically compressed deformable elements 82 which are associated with three preload teeth 60B of each backing disc 58A, 58B, 58C and which are arranged regularly around the backing discs 58A, 58B, 58C. Thus, the three deformable elements 82 are distributed at 120° from one another around the axis of rotation "B".

The deformable elements 82 are all identical and are arranged in a similar way on the backing discs 58A, 58B, 58C. Therefore only one of these deformable elements 82 will be described below.

To allow the deformable element 82 to be inserted between the preload teeth 60B, the latter are offset circumferentially in relation to one another by said single interdental angular pitch.

Each backing disc 58A, 58B, 58C thus has external radial toothing which is formed in three series of teeth 60A, 60B distributed regularly over the circumference of the backing disc 58A, 58B, 58C. The guide teeth 60A, 60B of a series are separated by a single interdental angular pitch. The downstream end tooth 60A, 60B of an upstream series is thus separated from the upstream end tooth 60B, 60A of a following downstream series by a hollow 84 of a double interdental angular pitch.

The upstream end teeth of each series of the front end backing disc 58C thus form preload teeth 60B, and the downstream end teeth of each series of the central backing disc 58B form preload teeth 60B.

The successive backing discs 58B, 58C are arranged so that the preload tooth 60B is axially opposite the hollow 84 of the adjacent backing disc 58C, 58B. Thus, the other guide teeth 60A of a backing disc 58B are arranged axially opposite the other guide teeth 60A of the other backing disc 58C.

This arrangement enables access to the preload teeth 60B to be released for mounting and fixing the deformable element 82.

Thus, the guide grooves 62A which house the congruent guide teeth 60A have roughly the same circumferential width as a single tooth 60A, while the housing grooves 62B have sufficient circumferential width to house two separated teeth 60B of a simple interdental angular pitch with circumferential play.

A single preload tooth 60B and a hollow 84 of each backing disc 58B, 58C are thus mounted in the associated housing groove 62B.

The deformable element 82 here is formed by an elastically flexible strip 82 in a radial plane which extends circumferentially from an upstream end 86 as far as a downstream end 88.

Strip 82 is made of a flexible metallic material such as spring steel.

As illustrated on FIG. 4, more particularly strip 82 has a camber having a point of inflection roughly in its middle so that the upstream 86 and downstream 88 end sections of strip 82 are directed parallel to the axial end faces of the preload teeth 60B.

Thus, in a non-loaded state, the upstream end of strip 82 is axially offset to the rear with respect to its downstream end so that the circumferential distance between the two ends is equal to the single interdental angular pitch.

In an axially loaded state of strips 82, the upstream 86 and downstream 88 ends are axially brought closer together so that the circumferential distance between the two ends is increased beyond the single interdental angular pitch.

The downstream end 88 of strip 82 is fixed to the rear face of the preload tooth 60B of the central backing disc 58B, while its upstream end 86 is fixed to the front face of the preload tooth 60B of the rear end backing disc 58A.

Thus, the consecutive backing discs 58B, 58A are rotationally linked by strip 82. This characteristic assists in obtaining a backing disc module 58 which is easier to handle during assembly. However it will be understood that the strips do not transmit any torque between the backing discs when the coupling device is in operation.

More particularly, strips 82 here are fixed by means of rivets 90 to the associated preload teeth 60B. For this purpose, each preload tooth 60B comprises a fixing orifice 92, as illustrated on FIG. 3.

According to an alternative of the invention—not illustrated—the rivets are made from the same material as the preload teeth.

Figure 2:
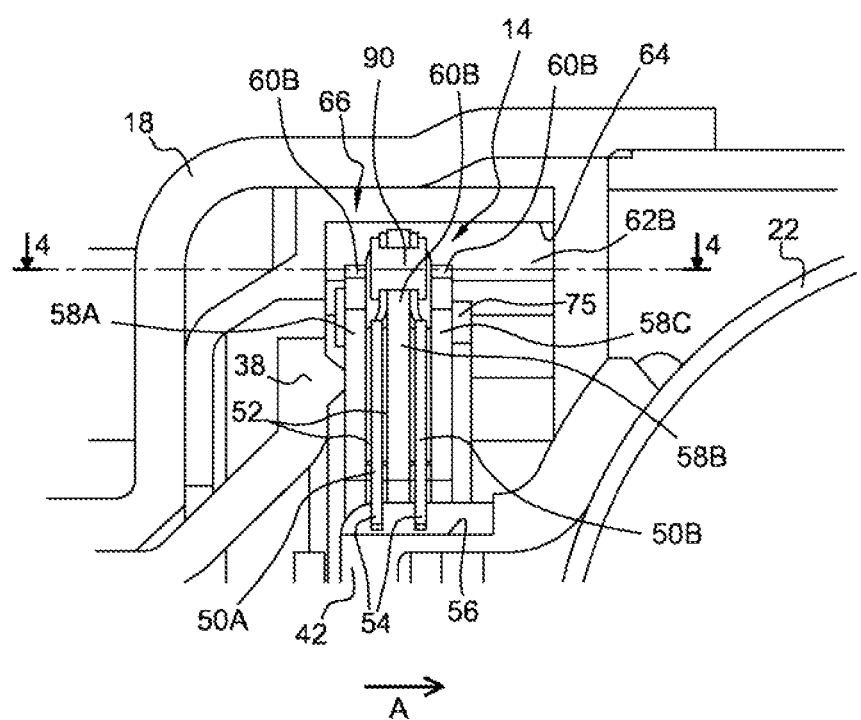
FIG. 2 is a detailed view in larger scale of FIG. 1 which illustrates the lock-up clutch.

As illustrated on FIGS. 2 and 4, flexible strips 82 are arranged symmetrically with respect to the plane of the central backing disc 58B between the front end backing disc 58C and the central backing disc 58B. Thus, the axial end backing discs 58A, 58C are loaded towards the upstream, while the central backing disc 58B is loaded towards the downstream.

Thus, the downstream preload tooth 60B of the central backing disc 58B is connected to the associated upstream preload teeth 60B of both end backing discs 58A, 58C.

During assembly of the lock-up clutch 14, the backing discs 58A, 58B, 58C are axially stacked alternately with the friction discs 50A, 50B. Then, the flexible strips 82 are fixed between the preload teeth 60B of each backing disc 58A, 58B, 58C. Thus the stack forms a module which is elastically deformable both axially and torsionally at the same time.

The module is thus axially inserted by the rear in the support ring 66 so that the front end backing disc 58A is in contact with the front axial abutment wall. The strips being in their non-loaded state, the backing discs 58A, 58B, 58C are oriented relative to one another so that the guide teeth 60A are congruent.

When the abutment ring 75 is inserted in its throat 74, it rests slightly axially against the front face of the front end backing disc 58A. This causes axial compression of the various backing discs 58A, 58B, 58C. Due to their camber, strips 82 expand circumferentially. They are shored up between the two associated preload teeth 60B then exerting a circumferential force on each preload tooth 60B so as to press the upstream preload teeth 60B flat against the upstream face 68 of the associated housing, and the downstream preload teeth 60B against the downstream face 70 of the associated housing.

Strips 82 are thus in a loaded state whenever piston 38 is in its disengaged rear position. More precisely strips 82 are in a loaded state whatever the position of the piston between its front position and its rear position.

Advantageously, the flexible strips 82 are able to exert a second axial force to return the backing discs 58A, 58B, 58C into an axially separated position. Thus when piston 38 passes from its engaged position to its disengaged position, strips 82 participate in accelerating the return of the backing discs 58A, 58B, 58C to their axially separated position.

The first mode of embodiment has been described in relation to a multi-disc lock-up clutch. It will be understood that this also applies to a lock-up clutch comprising a single friction disc.

Figure 6:
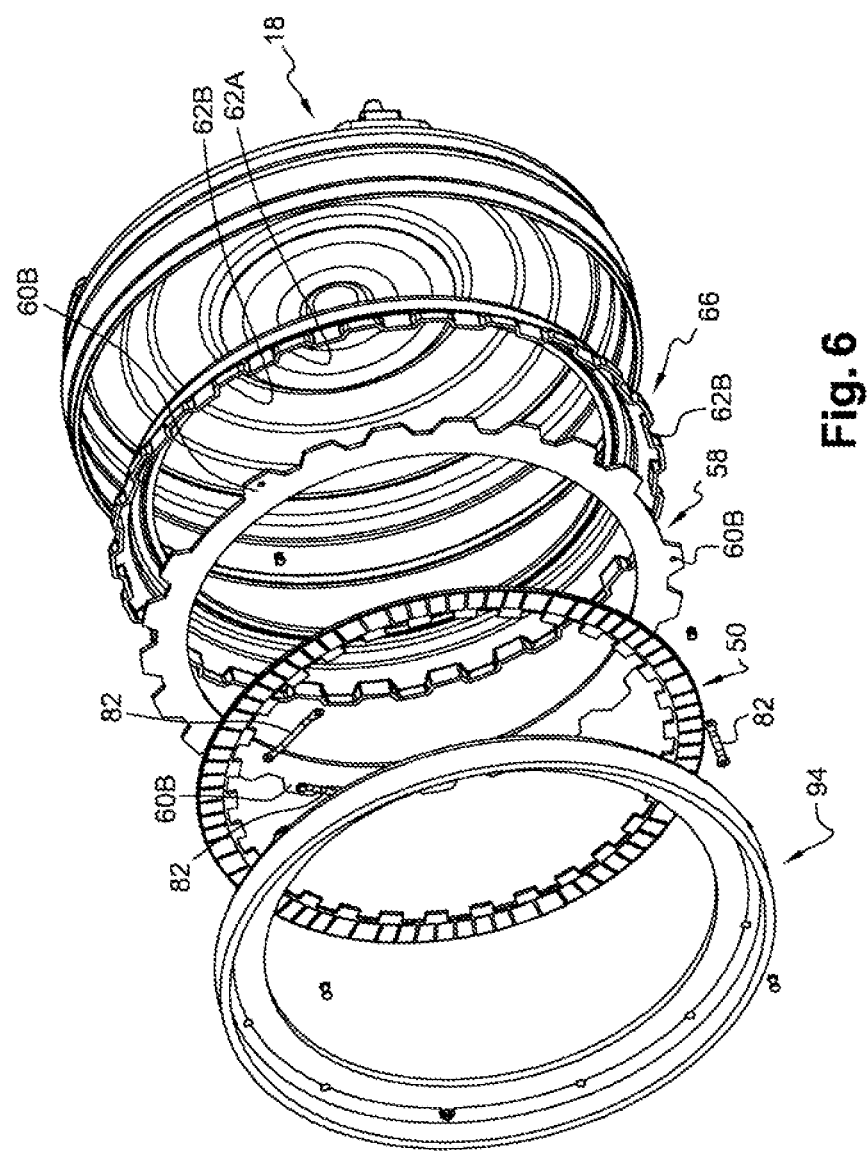
FIG. 6 is a view similar to that of FIG. 3 which illustrates a second mode of embodiment of the invention in which the lock-up clutch comprises a single backing disc and a reaction disc.
Figure 7:
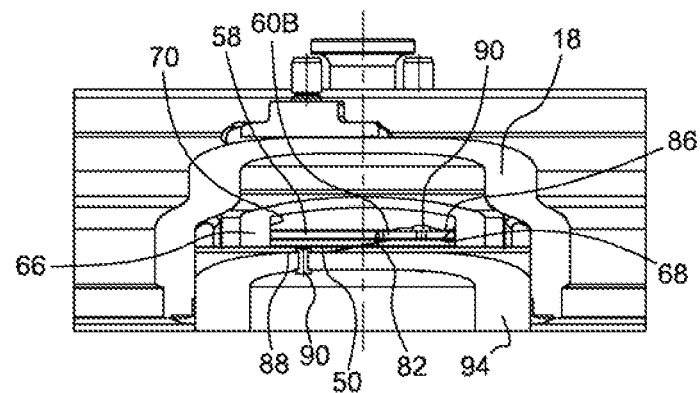
FIG. 7 is a view similar to that of FIG. 4 which illustrates the lock-up clutch according to the second mode of embodiment of the invention.

FIGS. 6 and 7 illustrate a second mode of embodiment of the invention. This mode of embodiment has many similarities with the first mode of embodiment of the invention. Therefore only the differences will be detailed below.

In this second mode of embodiment, the lock-up clutch 14 comprises a single friction disc 50 of a structure similar to that of the friction discs of the first mode of embodiment and which is arranged in the lock-up clutch 14 as described previously.

The lock-up clutch 14 also comprises a single backing disc 58 which is similar to those of the first mode of embodiment with the difference that the external toothing is complete, that is to say it does not comprise a hollow. Thus, for the structure and assembly of backing disc 50, reference should be made to what has been described in the first mode of embodiment.

Different to what has been described in the first mode of embodiment, each guide groove 62B associated with a preload tooth 60B has sufficient circumferential width to house a single preload tooth 60B with circumferential play. Thus, the guide grooves 62B associated with the preload teeth 60B are identical to the other guide grooves 62A.

In this second mode of embodiment, the axial forward abutment element of friction disc 50 is formed by a front reaction disc 94 of annular shape which comprises a rear annular radial face. The reaction disc 94 is intended to be fixed to the support ring 66 so that the friction disc 50 is interposed axially between backing disc 58 and the rear face of the reaction disc 94. The reaction disc 94 is thus mounted rotating as one and axially with the support ring 66.

The rear face of the reaction disc 94 thus at the same time plays the role of the abutment ring 75 in the first mode of embodiment and the role of the second backing disc.

As illustrated in more detail on FIG. 7, the deformable element 82 is interposed axially between the guide tooth 60B of backing disc 58 and an anchoring element rotating as one with the first backing disc, the anchoring element being formed here by the reaction disc 94.

More precisely, the upstream end 86 of the deformable element 82 is fixed to the preload tooth 60B backing disc 58, while the other downstream end 88 of the deformable element 82 is fixed to the external periphery of the abutment face of the reaction disc 94, by means of rivets 90 for example.

The action of the deformable elements 82 is similar to what has been described in the first mode of embodiment. Thus, when the reaction disc 94 is fixed to the support ring 66 enclosing backing disc 58, strips 82 expand circumferentially. They are shored up between the associated preload teeth 60B and the reaction disc 94, then exerting a circumferential force on each preload tooth 60B so as to press each preload tooth 60B flat against the downstream face 70 of the associated guide groove 62B.

Strips 82 are thus in a loaded state whenever piston 38 is in its disengaged rear position. More precisely strips 82 are in a loaded state, whatever the position of the piston between its front position and its rear position.

Thus, when backing disc 58 is pushed towards the reaction disc 94 to clamp the friction disc 50, the upstream 86 and downstream 88 ends of the deformable element 82 have a tendency to circumferentially move away from one another, thus pressing the preload tooth 60B even more heavily against the downstream face 70 of the guide groove 62B as illustrated on FIG. 7.

Figure 8:
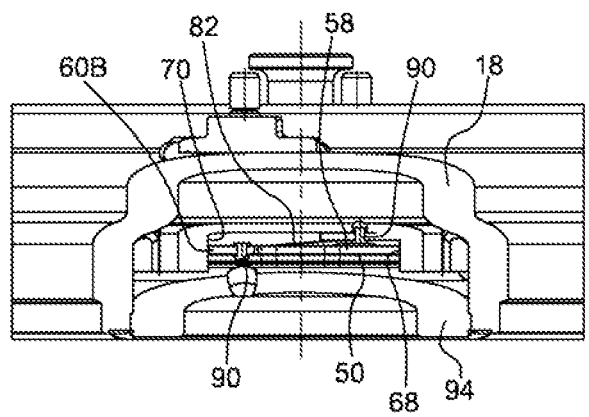
FIG. 8 is a view similar to that of FIG. 7 which illustrates the lock-up clutch formed according to a third mode of embodiment of the invention.

FIG. 8 illustrates a third mode of embodiment of the invention. The lock-up clutch 14 formed according to this third mode of embodiment is very similar to that of the second mode of embodiment.

Thus FIG. 6 and the description of it, which was detailed previously, are applicable to this third mode of embodiment except for the arrangement of the deformable elements 82.

As illustrated on FIG. 8, the deformable element 82 is interposed axially between the guide tooth 60B of backing disc 58 and an anchoring element rotating as one with the first backing disc, the anchoring element being formed here by the rear flange 72 of the support ring 66.

More precisely, the upstream end 86 of the deformable element 82 is fixed to the preload tooth 60B of backing disc 58, while the other downstream end 88 of the deformable element 82 is fixed to the rear flange 72 of support ring 66, by means of rivets 90 for example.

The action of the deformable elements 82 is similar to what has been described in the first mode of embodiment, with the difference that the deformable elements 82 here work by traction while in the first two modes of embodiment, they worked by compression.

Thus, when backing disc 58 is arranged in the support ring 66, strips 82 are shortened circumferentially with respect to their neutral position. They pull circumferentially on the associated preload teeth 60B resting on the support ring 66, then exerting a circumferential force on each preload tooth 60B so as to press each preload tooth 60B flat against the upstream face 68 of the associated guide groove 62B.

Strips 82 are thus in a loaded state in traction whenever piston 38 is in its disengaged rear position. More precisely strips 82 are in a loaded state whatever the position of the piston between its front position and its rear position.

Thus, when backing disc 58 is pushed towards the reaction disc 94 to clamp the friction disc 50, the upstream 86 and downstream 88 ends of the deformable element 82 have a tendency to circumferentially come together, thus pressing the preload tooth 60B even more heavily against the upstream face 68 of the guide groove 62B as illustrated on FIG. 8.

According to an alternative of the invention—not illustrated—which is applicable to the three modes of embodiment described previously, strips 82 are formed by an axial stack of several single strips so as to form a compound strip having appropriate stiffness.

Figure 9:
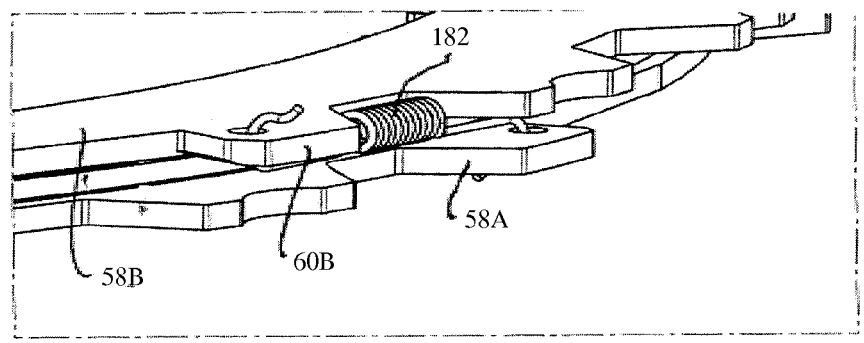
FIG. 9 is a partial perspective view of the lock-up clutch device according to the alternative embodiment of the invention.
Figure 10:
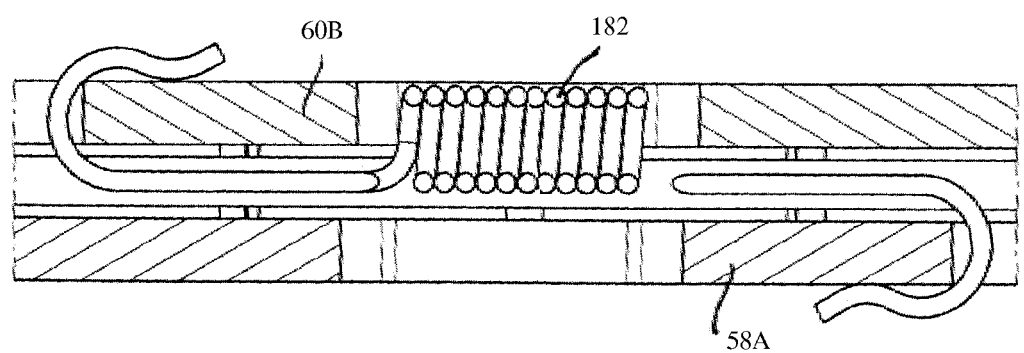
FIG. 10 is a top view of the lock-up clutch device according to the alternative embodiment of the invention.

According to another alternative of the invention, illustrated on FIGS. 9 and 10, which is applicable to the three modes of embodiment described previously, the deformable element is formed by a spring, for example a coil or accordion spring 182, of tangential direction whose first upstream end is fixed to the preload tooth upstream while the second downstream end is fixed to the downstream preload tooth. The coil spring is in a circumferentially compressed state whenever the lock-up clutch is mounted in its disengaged position.

According to still another—not illustrated—alternative of the invention which is applicable to the three modes of embodiment described previously, the deformable element is formed by a rod made of an elastically compressively deformable material such as an elastomer or a metal. The rod is in a circumferentially compressed state whenever the lock-up clutch is mounted in its disengaged position.

The invention claimed is:

1. A hydrokinetic coupling device (10), in particular for a motor vehicle, of longitudinal axis of rotation (B), having a lock-up clutch (14) comprising:

at least one coaxial friction disc (50A, 50B) rotating as one with a first rotary shaft and mounted such that it can slide axially with respect to the first rotary shaft;

first and second coaxial backing discs (58A, 58B, 58C) rotating as one with a second rotary shaft and mounted such that the first and second backing discs being axially slideable with respect to the second rotary shaft, the friction disc (50A, 50B) being interposed axially between the first and second backing discs;

at least one axial abutment element (75, 94) rotating as one with each of the first and second backing discs (58A, 58B, 58C) for enabling a reaction to be created for clamping the friction disc (50, 50A, 50B);

a coaxial support ring (66) of each of the first and second backing discs (58A, 58B, 58C) rotating as one with the second rotary shaft and comprising at least one axial guide groove (62B) circumferentially delineated by an upstream face (68) and by a downstream face (70), an associated radial guide tooth (60B) of each of the first and second backing discs (58A, 58B, 58C) being housed such that the first and second backing discs being axially slideable with circumferential play in the guide groove (62B);

a rear piston (38) moveable between a disengaged rear position in which the backing disc (58, 58A, 58B, 58C) are axially separated, and an engaged front position in which each backing disc (58, 58A, 58B, 58C) is pushed forward axially against the axial abutment element (94) clamping the intercalated friction disc (50, 50A, 50B) so as to rotationally couple the first rotary shaft with the second rotary shaft; and elastic preload means (82) exerting a preload torque to clamp the guide tooth (60B) of at least one of the first and second backing discs (58A, 58B) circumferentially against one of either the upstream (68) or downstream (70) faces of the guide groove (62B);

the elastic preload means comprising an elastically circumferentially deformable element interposed axially between the guide tooth of the first backing disc and the guide tooth of the second backing disc;

the elastically circumferentially deformable element (82) mounted circumferentially loaded so as to exert a circumferential force so as to produce the preload torque to separate the guide teeth (60B) of the consecutive first and second backing discs (58A, 58B) circumferentially against each of the upstream (68) and downstream (70) faces of the guide groove (62B).

2. The device according to claim 1, wherein the deformable element is housed in the associated guide groove.

3. The device (10) according to claim 1, wherein the guide tooth (60B) of the first backing disc (58A, 58B, 58C) is offset circumferentially by a fixed angular pitch with respect to the associated guide tooth (60B) of the second backing disc (58A, 58B, 58C).

4. The device (10) according to claim 1, wherein each backing disc (58, 58A, 58B, 58C) comprises a plurality of radial guide teeth (60B) which are distributed around the backing disc (58, 58A, 58B, 58C) and each of which is housed in an associated axial guide groove (62B) of the support ring (66), and in that the elastic preload means comprise a plurality of deformable elements (82) which are associated with the guide teeth (60B) and which are arranged around the backing disc (58, 58A, 58B, 58C).

5. The device (10) according to claim 4, wherein the elastic preload means comprise three deformable elements (82) which are distributed 120° from one another around the axis of rotation (B).

6. The device (10) according to claim 5, wherein each end (86, 88) of the strip (82) is fixed by means of rivets (90) to the tooth (60B) or the associated anchoring element (58A, 58B, 58C, 66, 94).

7. The device (10) according to claim 6, wherein the rivets (90) are made of the same material as the teeth (60B).

8. The device (10) according to claim 1, wherein the two consecutive backing discs (58A, 58B, 58C) are rotationally linked by the deformable elements (82).

9. The device (10) according to claim 1, wherein the deformable element (82) is able to exert a second axial force to return the two consecutive backing discs (58A, 58B, 58C) into an axially separated position.

10. The device (10) according to claim 1, wherein the elastically deformable element (82) is formed by at least one elastically flexible strip (82) which is oriented circumferentially, an upstream end (86) of the strip (82) being fixed to the guide tooth (60B) of the first backing disc (58, 58A, 58C) and a downstream end (88) of the strip (82) being fixed to the anchoring element (58A, 58B, 58C, 66, 94).

11. The device (10) according to claim 10, wherein, in its non-loaded state, the strip (82) is axially cambered so that its upstream end (86) is offset axially with respect to its downstream end (88), the strip (82) being in a loaded state whenever the piston (38) is in its disengaged rear position so as to produce the preload force.

12. The device (10) according to claim 1, wherein the elastically deformable element (82) is formed by at least one coil spring which is arranged circumferentially compressed between the two guide teeth (60B) of the same groove (62B).

13. The device (10) according to claim 1, wherein the elastically deformable element (82) is formed by a rod made of an elastomeric material which is arranged circumferentially compressed between the two guide teeth (60B) of the same groove (62B).

14. The device (10) according to claim 1, wherein the lock-up clutch (14) comprises at least two coaxial friction discs (50A, 50B) and further comprises a third backing disc (58C) coaxial with the first and second coaxial backing discs and at least two coaxial friction discs (50A, 50B); the two friction discs (50A, 50B) are successively interposed between first, second and third backing discs; and wherein the elastic preload means (82) includes first elastic preload means (82) arranged between the first and the second backing discs (58A, 58B), and second elastic preload means (82) arranged between the second and the third backing discs (58B, 58C).

15. The device (10) according to claim 1, wherein the guide tooth (60B) of each backing disc (58, 58A, 58B, 58C) extends radially towards the outside, and wherein the associated guide groove (62B) is arranged in the internal axial face (64) of the annular ring (66) which surrounds each backing disc externally (58, 58A, 58B, 58C).

16. A hydrokinetic coupling device (10), in particular for a motor vehicle, of longitudinal axis of rotation (B), having a lock-up clutch comprising:
- at least one coaxial friction disc rotating as one with a first rotary shaft and mounted such that it can slide axially with respect to the first rotary shaft;
- a first backing disc rotating as one with a second rotary shaft and mounted such that the first backing disc being axially slideable with respect to the second rotary shaft;
- at least one axial abutment element rotating as one with the first backing disc, the friction disc being interposed axially between the first backing disc and the abutment element for enabling a reaction to be created for clamping the friction disc;
- a coaxial support ring of the first backing disc rotating as one with the second rotary shaft and comprising at least one axial guide groove circumferentially delineated by an upstream face and by a downstream face, an associated radial guide tooth of the first backing disc being housed such that the first backing disc being axially slideable with circumferential play in the groove;
- a rear piston moveable between a disengaged rear position in which the first backing disc axially separated, and an engaged front position in which the first backing disc is pushed forward axially against the axial abutment element clamping the intercalated friction disc so as to rotationally couple the first rotary shaft with the second rotary shaft; and
- elastic preload means exerting a preload torque to clamp the guide tooth of the first backing disc circumferentially against one of either the upstream or downstream faces of the guide groove;
- the elastic preload means comprising an elastically circumferentially deformable element interposed axially between the guide tooth of the first backing disc and the abutment element rotating as one with the first backing disc;
- the elastically circumferentially deformable element mounted circumferentially loaded so as to exert a circumferential force for clamping the tooth so as to produce the preload torque.

17. A hydrokinetic coupling device, in particular for a motor vehicle, of longitudinal axis of rotation (B), having a lock-up clutch comprising:
- at least one coaxial friction disc rotating as one with a first rotary shaft and mounted such that it can slide axially with respect to the first rotary shaft;
- a first backing disc rotating as one with a second rotary shaft and mounted such that the first backing disc being axially slideable with respect to the second rotary shaft;
- at least one axial abutment element rotating as one with the first backing disc, the friction disc being interposed axially between the first backing disc and the abutment element for enabling a reaction to be created for clamping the friction disc;
- a coaxial support ring of the first backing disc rotating as one with the second rotary shaft and comprising at least one axial guide groove circumferentially delineated by an upstream face and by a downstream face, an associated radial guide tooth of the first backing disc being housed such that the first backing disc being axially slideable with circumferential play in the groove;
- a rear piston moveable between a disengaged rear position in which the first backing disc axially separated, and an engaged front position in which the first backing disc is pushed forward axially against the axial abutment element clamping the intercalated friction disc so as to rotationally couple the first rotary shaft with the second rotary shaft; and
- elastic preload means exerting a preload torque to clamp the guide tooth of the first backing disc circumferentially against one of either the upstream or downstream faces of the guide groove;
- the elastic preload means comprising an elastically circumferentially deformable element interposed axially between the guide tooth of the first backing disc and an anchoring element rotating as one with the first backing disc;
- the elastically circumferentially deformable element mounted circumferentially loaded so as to exert a circumferential force for clamping the tooth so as to produce the preload torque;
- the elastically deformable element formed by a rod made of an elastomeric material arranged circumferentially compressed between the two guide teeth of the same groove.

* * * * *